United States Patent [19]

Benstead et al.

[11] 4,183,993
[45] Jan. 15, 1980

[54] REINFORCED FABRIC AND LAMINATE MADE THEREWITH

[75] Inventors: Bryan C. Benstead, Walhalla, S.C.; Robert T. Seith, Tuscaloosa, Ala.

[73] Assignee: Gulf States Paper Corporation, Tuscaloosa, Ala.

[21] Appl. No.: 873,542

[22] Filed: Jan. 30, 1978

[51] Int. Cl.² .............................................. B32B 7/00
[52] U.S. Cl. ................................ 428/253; 66/190; 428/245; 428/273; 428/408
[58] Field of Search ............... 66/190, 9 R; 428/253, 428/254, 265, 273, 408

[56] References Cited

U.S. PATENT DOCUMENTS

| | | | |
|---|---|---|---|
| 2,893,442 | 7/1959 | Genin | 139/383 |
| 3,235,323 | 2/1966 | Peters | 423/447.4 |
| 3,256,130 | 6/1966 | Nisbet | 428/254 |
| 3,507,130 | 4/1970 | Marks et al. | 66/169 |
| 3,621,677 | 11/1971 | Marks et al. | 66/9 R |
| 3,819,461 | 6/1974 | Saffadi | 66/193 |
| 3,943,733 | 3/1976 | Wily | 66/190 |
| 3,949,570 | 4/1976 | Niederer | 66/190 |

*Primary Examiner*—James J. Bell
*Attorney, Agent, or Firm*—Cushman, Darby & Cushman

[57] ABSTRACT

A unidirectional reinforcing fabric and a resinous laminate made therewith, which fabric includes a weft knit yarn fabric formed of a multiplicity of weft knit stitches and a multiplicity of parallel longitudinally extending warp inserts held in said weft knit fabric. A bi-directional fabric is also disclosed which includes in addition to the above a multiplicity of parallel transversely extending weft inserts. Each insert includes a multiplicity of continuous monofilaments extending longitudinally in parallel relation with respect to one another without crimp or twist and grouped closely together so that the outline cross-sectional configuration of the group is approximately in the shape of an elongated rectangle. Each monofilament of each insert is formed from a material taken from the group consisting of glass, carbon and aramid and has a cross-sectional diameter of between 0.00032" and 0.00095". Each insert has the thickness of the rectangular cross-sectional configuration thereof between 0.003" and 0.38", the width of the rectangular cross-sectional configuration thereof between 0.009" and 0.75" and a ratio of width-to-thickness of between 2 and 30. The total width of the warp inserts per yard width of fabric is between 55% and 98%. The total width of the weft inserts per yard length of fabric is between 55% and 98%.

12 Claims, 5 Drawing Figures

REINFORCED FABRIC AND LAMINATE MADE THEREWITH

This invention relates to reinforced laminates and more particularly to an improved fabric for use as reinforcing in such laminates and the resulting laminate product thereof.

The term "laminate" as herein used generally refers to the combination of a thermosetting resin and a reinforcement. The form in which such laminates are ultimately utilized includes (1) tubular stocks, such as large marine antenna, fishing poles, light poles and the like, (2) pipes and conduits, as for example, reinforced plastic pipes, (3) hand lay-up articles, such as boats and other products related to the marine industry, vehicular bodies, containers, shelters, shower stalls and the like, (4) pultrusions such as I-beams, rods and other structural members with uniform cross-sectional configuration and (5) large flat sheets, as for example, walls used in cargo containers, truck or trailer walls and insulation board.

Insofar as the resin system is concerned, the resins which are conventionally employed for making laminated articles are the type of material disclosed in Duffin, Laminated Plastics, Second Edition (1966). In general, the material used for reinforcing is glass, with E type glass being predominately used. Other specific examples include carbon or graphite or aramid material. The physical condition of the reinforcement within the resin system takes many forms. Examples here include (1) chopped strands which are strands cut to lengths of ⅛ to 2" and sold in bulk, (2) yarns which are twisted yarns with after finish, (3) rovings, which is a rope-like bundle of strands of continuous fibers or filaments, (4) reinforcing mats which consist of chopped or continuous strands in non-woven random matting, (5) surfacing or overlay mats which are low reinforcing monofilaments in random mats, (6) woven fabrics which are cloths woven with yarns, and (7) woven roving which is a coarser cloth heavier than fabrics woven of rovings or rovings and yarn.

To some extent the nature of the laminate article will determine the most desirable form of the reinforcement used in the laminate. For example, in tubular stocks, pipes and pultrusions, all of which are usually elongated in one direction, it is desirable to have the reinforcements extend in the elongated direction. Thus, in these situations reinforcement in the form of rovings or yarns are often used, although fabrics including both woven fabrics and woven rovings are also used. In such instances, a desirable characteristic of the woven reinforcement is that the longitudinally extending yarns of the woven fabric provide the necessary reinforcement extending along the elongated extent of the finished laminate article. Where individual rovings or yarns are utilized a more difficult handling problem is presented. Where strength is a characteristic of the final laminate article it is almost always the case that greater reinforcement strength can be imparted to an elongated article by the utilization of continuous filaments of reinforcement extending in the direction of elongation as compared with chopped strands or staple fibers. Similarly, when dealing with hand lay-ups and large flat sheets, greater strength can be imparted by the utilization of woven fabrics containing continuous filaments as compared with staple fibers or staple fiber mats. From the above it can be concluded that in general utilization of fabrics made from continuous filament yarns or rovings provides a desirable combination of ease of handling in the reinforcement material and strength in the laminate article.

One limitation which is recognized in connection with reinforcing material in woven fabric form is that the inherent crimp imparted to the continuous filament yarns or rovings of reinforcing material detracts from the ability of the material itself to provide maximum strength. Thus, there is a tendency for such materials to stretch until the resin system fails and before the actual strength of the material itself in resisting tension comes into play.

A fair summary of the state of the prior art is contained in U.S. Pat. No. 3,819,461 and specifically the opening paragraphs of the specification of this patent, which includes a detailed discussion of the crimping problem in connection with reinforcing fabrics and a recitation of prior attempts to solve the problem. In this recitation U.S. Pat. Nos. 2,893,442; 3,256,130; and 3,235,323 are mentioned. The improvement disclosed in U.S. Pat. Nos. 3,819,461 against this background consists essentially in producing the reinforcing fabric by knitting on a warp knit knitting machine with the insertion of wefts of high modulus graphite yarns.

The fabric configuration produced in accordance with the teaching contained in U.S. Pat. No. 3,819,461 does provide for maintaining the weft inserted yarns parallel to one another by the chain stitches of the knitted fabric. However, there are several inherent limitations to the fabric produced in accordance with the teachings of the patent. First, the continuous extent of the fabric in the direction of longitudinal extent of the weft insert yarns is limited by the width of the knitting machine. Consequently, it would not be possible to provide reinforcing fabric useful in a light pole in which the reinforcing yarns extended continuously throughout the length of the laminated light pole. All of the illustrative embodiments given in the patent relate to the build-up or utilization of a great number of layers of fabric in the laminate product being made, as for example, twelve layers. Moreover, the particular fabric is brittle and cannot be wound up in a small radius as, for example, in fishing poles or the like.

A second limitation to the fabric produced in accordance with U.S. Pat. No. 3,819,461 has to do with the interlaminar sheer strength of the final laminate. This characteristic of the laminate is a function of the ability of the resin to contact the insert yarns, such contact being effected by the cross-sectional configuration of the yarns and the spacing of the wales which serve to hold the yarns in parallelism. In the disclosure, the wale spacing is preferably at least about three times the cross-sectional diameter of the parallel insert yarns expressed in the same units. The fact that the linear dimension between wales is related to a linear diameter cross-sectional dimension indicates that the yarns utilized as weft inserts are twisted so that their cross-section is generally circular or that they otherwise have a cross-sectional configuration approximating a circle with a diameter.

In summary, while U.S. Pat. No. 3,819,461 has correctly coordinated the reinforcing fabric strength with the maintenance of the reinforcing yarns in parallelism, the solution proposed to achieve such parallelism is limited insofar as the longitudinal extent of this parallelism can be carried out. Moreover, there is no contemplation of maintaining parallelism of continuous filaments within the weft insert yarns themselves. Indeed, the circular cross-sectional configuration of the weft insert yarns utilized would indicate that the filaments employed have some twist imparted thereto so that they are not parallel to one another.

An object of the present invention is to provide a reinforcing fabric of the type described above wherein parallel inserts of continuous multifilament reinforcing material are held in parallelism by a knit structure which overcomes the limitations noted above. In accordance with the principles of the present invention, this objective is obtained by producing the fabric on a circular weft knitting machine and providing the inserts in the warp of the fabric thus knitted. This feature enables a continuous multifilament reinforcing material to extend longitudinally beyond the circumference of the machine and to extend to an indefinite dimension in the machine direction. In addition, the inserts themselves which may have an indefinite continuous longitudinal extent are formed from a multiplicity of continuous monofilaments grouped together so that they are maintained parallel to one another and have a cross-sectional configuration which is elongated in width and has a width-to-thickness ratio of at least 2 and preferably 4.8. In this way, the advantages of parallelism heretofore recognized from yarn-to-yarn are also achieved on a filament-to-filament basis. Moreover, by utilizing an elongated width cross-sectional configuration (rather than circular) there exists the ability to maximize the reinforcing material density within a strata equal to the insert thickness as compared with the density which can be achieved with the diameter type cross-sectional configuration of the prior art within a strata equal to the insert diameter thickness. With the present invention strata density is limited only by the ability to closely group individual monofilaments and to closely space adjacent groups of monofilaments. The weight of reinforcing material per square yard of fabric is increased by increasing the thickness of the warp insert. Preferably, however, the ratio of cross-sectional width of the inserts to cross-sectional thickness thereof also increases. This means that the number of knitted stitches per running width of the fabric decreases so that the volume between adjacent parallel inserts occupied by the stitches decreases. Stated differently, the width of reinforcing material contained in a one-yard wide section of fabric will likewise increase.

Another limitation inherent in the prior art fabric as disclosed in U.S. Pat. No. 3,819,461 is that it is not possible to produce a fabric which has both weft inserts ans warp inserts. Consequently, where bi-axial strength is required, as for example, in large sheet articles and hand lay-ups, additional labor must be provided in order to secure such bi-axial strength by means of plural lay-ups in which the inserts are oriented 90° with respect to one another.

A further object of the present invention is to provide a single fabric having both warp and weft inserts which secure the advantages of the present invention as indicated above in two directions rather than one.

These and other objects of the present invention will become more apparent during the course of the following detailed description and appended claims.

The invention may best be understood with reference to the accompanying drawings, wherein an illustrative embodiment is shown.

Figure 1:
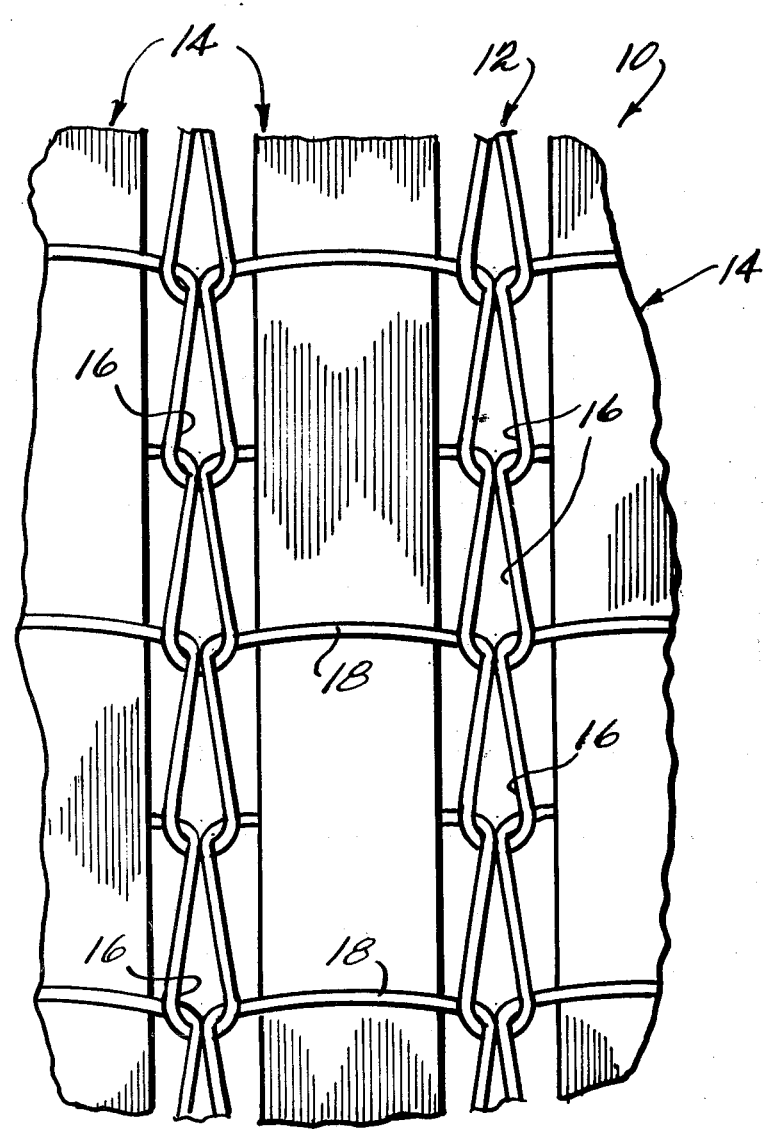
FIG. 1 is a fragmentary plan view of one embodiment of a unidirectional fabric embodying the principles of the present invention.

Referring now more particularly to the drawings, there is shown in FIG. 1 thereof a lightweight unidirectional reinforcing fabric, generally indicated at 10, embodying the principles of the present invention. The fabric 10 is made on a circular knitting machine constructed in accordance with the disclosure contained in Marks et al. U.S. Pat. Nos. 3,507,130 and 3,621,677. Accordingly, the disclosure of these two patents is hereby incorporated by reference into the present specification.

The fabric 10 as produced on the circular knitting machine of the patents includes a weft knit yarn fabric, generally indicated at 12, and a multiplicity of parallel longitudinally extending warp inserts, generally indicated at 14. As shown, the weft knit yarn fabric is a jersey stitch including a multiplicity of longitudinally extending stitch sections 16 and a multiplicity of transversely extending stitch sections 18. The yarn utilized is polyester 350/100. The warp inserts 14 are held in parallel relation within the knit fabric 12 by disposing the transverse stitch sections 18 on opposite sides thereof in longitudinally spaced relation along the longitudinal extent of the warp inserts. The longitudinally extending stitch sections 16 are disposed between adjacent parallel warp inserts.

In accordance with the principles of the present invention, each insert 14 is formed of a multiplicity of continuous monofilaments extending longitudinally in parallel relation with respect to one another without crimp or twist and grouped closely together so that the outline cross-sectional configuration of the group is approximately in the shape of an elongated rectangle. The elongated dimension of the rectangular cross-sectional configuration which is illustrated in FIG. 1 extends transversely in the plane of the reinforcing fabric 10 and constitutes the width of the insert. The other dimension of the rectangular cross-sectional configuration constitutes the thickness of the insert and corresponds to the thickness of the reinforcing fabric 10. Each monofilament of each insert 14 is formed from E-glass and has a cross-sectional diameter of 0.0006".

Figure 2:
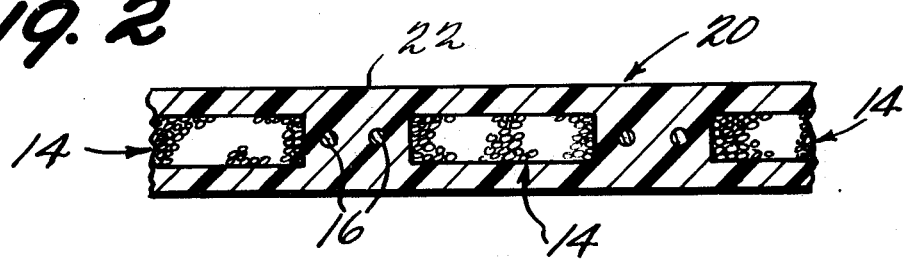
FIG. 2 is a fragmentary cross-sectional view of a laminate in which the fabric shown in FIG. 1 is used as a reinforcement.

With reference now to FIG. 2, the fabric 10 is shown embodied within a laminate, generally indicated at 20. The laminate 20 includes a body of cured thermosetting polyester resin 22 having the fabric 10 embedded therein in accordance with conventional laminate technology. FIG. 2 illustrates the specific elongated rectangular cross-sectional configuration of each of the inserts 14. As shown, the outline of the cross-sectional configuration is formed by grouping together the multiplicity of continuous parallel monofilaments of the insert 14 in closely adjacent relation. The thickness dimension of the outline rectangular cross-section as shown in FIG. 2 is approximately 0.013". The width dimension of the outline cross-sectional configuration of each insert is 0.0625". The ratio of the width dimension with respect to the thickness dimension is 4.8. With reference to FIG. 2, it can be seen that the strata within the body of resin material 22 represented by the thickness of the inserts presents filaments of reinforcing material throughout the strata except in those spaces between inserts where the longitudinally extending yarn stitch sections 16 are positioned. The total width of the inserts 14 per yard width of fabric is approximately 62.5%. The weight of the reinforcing material provided in the fabric 10 on a square yard basis is approximately 12 oz per square yard.

Figure 3:
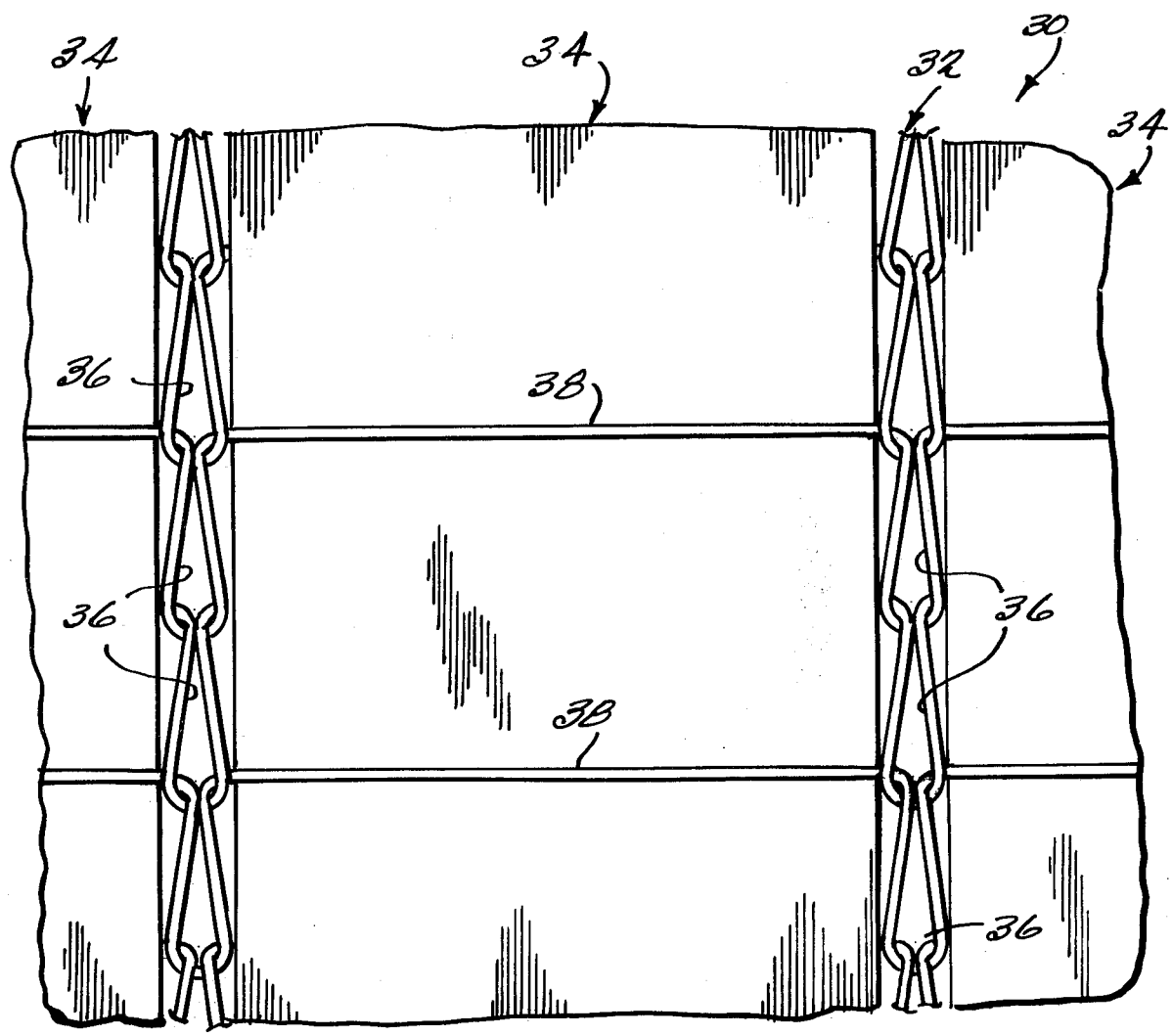
FIG. 3 is a view similar to FIG. 1 showing another embodiment of a unidirectional reinforcement fabric embodying the principles of the present invention.

Referring now more particularly to FIG. 3, there is shown therein a coarse unidirectional reinforcing fabric 30 embodying the principles of the present invention. The fabric 30 is formed on the same machine as the fabric 10, the difference in spacing being provided by dropping spaced needles throughout the circumference of the machine. The fabric 30 is similar to the fabric 10 in that it includes a weft knit yarn fabric, generally indicated at 32, and a multiplicity of parallel longitudinally extending warp inserts, generally indicated at 34. The weft knit yarn fabric 32 is similar to the weft knit fabric 12 previously described in that it is a jersey knit providing a multiplicity of longitudinally extending stitch sections 36 and a multiplicity of transversely extending stitch sections 38. As before, the inserts 34 are retained in parallel relation within the fabric 30 by disposing transversely extending stitch sections 38 on opposite sides of the inserts in spaced relation longitudinally therealong and by disposing the longitudinal stitch sections 36 between adjacent inserts.

Figure 4:
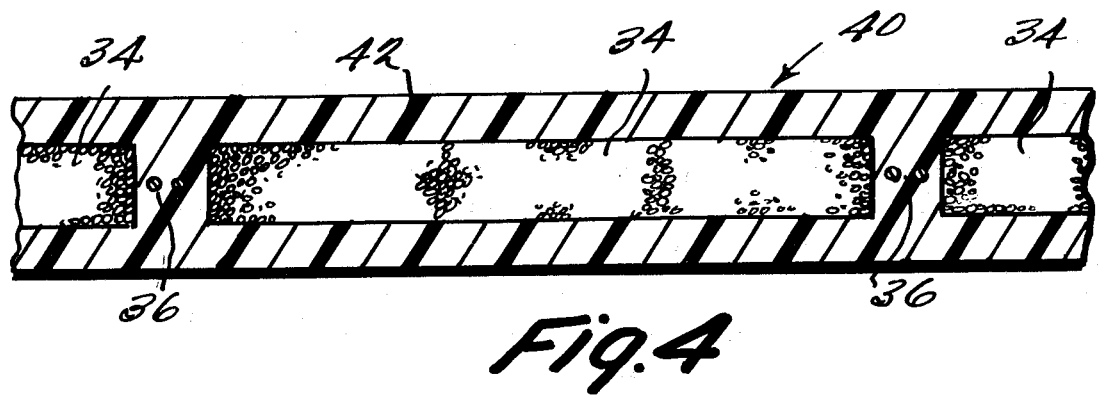
FIG. 4 is a fragmentary cross-sectional view similar to FIG. 2 in which the fabric of FIG. 3 is used as the reinforcement.

With reference to FIG. 4, there is shown therein a laminate, generally indicated at 40, which embodies the reinforcing fabric 30. The laminate includes a body of cured thermosetting polyester 42 within which the reinforcing fabric 30 is embedded. As best shown in FIGS. 3 and 4, the yarn which forms the weft knit fabric 32 is of a material and configuration the same as the yarn of the fabric 12. Each insert 34 is formed with a multiplicity of continuous monofilaments extending longitudinally in parallel relation with respect to one another without crimp or twist and closely grouped together so that the outline cross-sectional configuration of the group is approximately in the shape of an elongated rectangle. Each monofilament is formed of E-glass and has a diameter dimension of 0.0007". The thickness dimension of the outline cross-sectional configuration of each insert 34 is 0.025" and the width dimension is 0.225". The total width of the inserts 34 per yard width of the fabric 30 is approximately 90% and the weight of the reinforcing material in the fabric is approximately 23 oz. per square yard.

Figure 5:
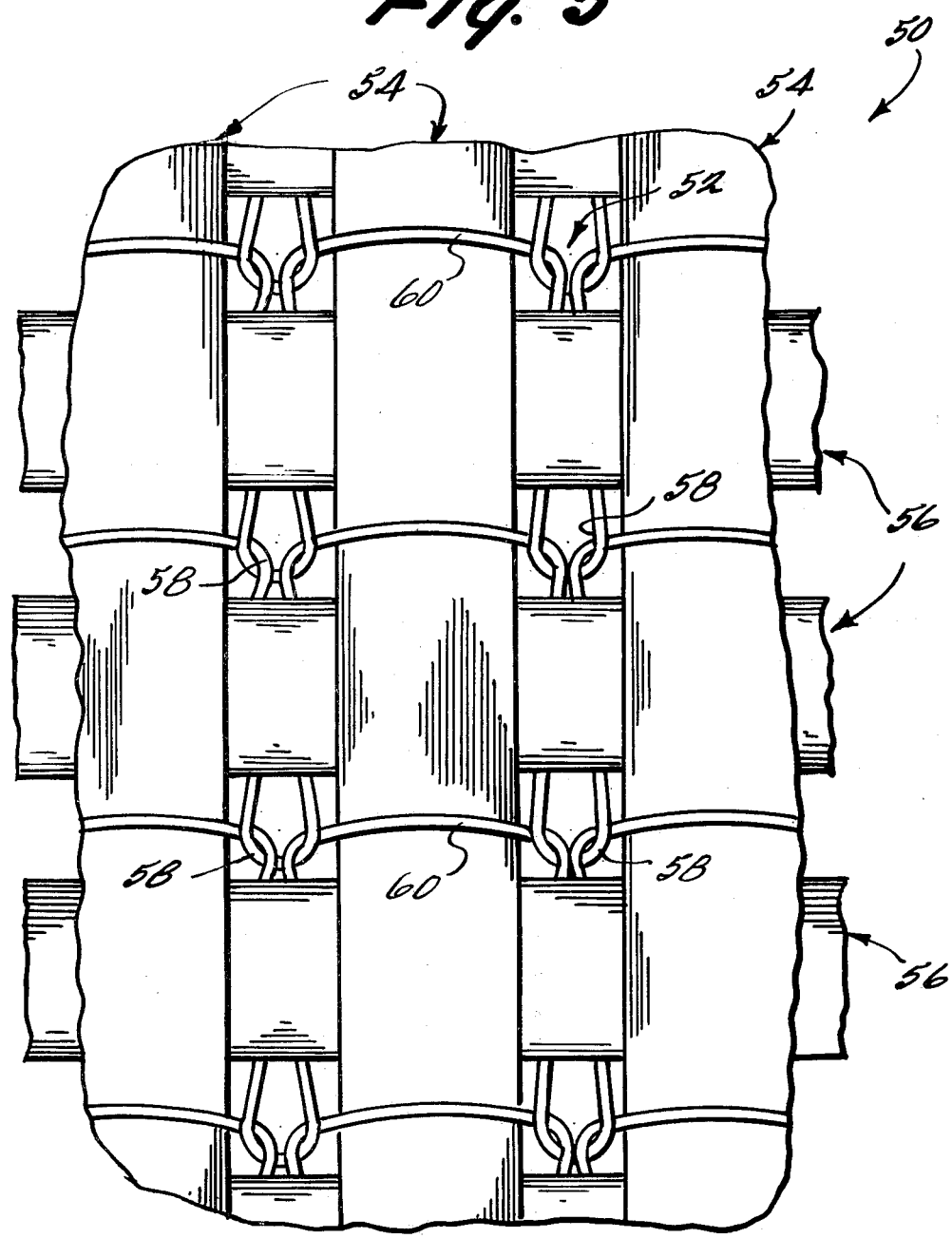
FIG. 5 is a fragmentary view of a bi-directional fabric embodying the principles of the present invention.

Referring now more particularly to FIG. 5, there is shown an essentially bi-directional reinforcing fabric, generally indicated at 50, embodying the principles of the present invention. The fabric 50 is produced on the machine disclosed in Wily U.S. Pat. No. 3,943,733, which patent discloses the modifications to the machine disclosed in the aforesaid Marks et al. patents to produce a fabric which has both warp inserts and weft inserts. Accordingly, the fabric 50 includes a weft knit yarn fabric, generally indicated at 52, a multiplicity of parallel, longitudinally extending warp inserts 54, and a multiplicity of parallel transversely extending weft inserts 56. As before, the weft knit fabric is of a jersey stitch and includes a multiplicity of longitudinally extending stitch sections 58 and a multiplicity of transversely extending stitch sections 60. As shown, the inner sides or surfaces of the wrap inserts 54 and weft inserts 56 are disposed in interengagement and the outer sides or surfaces of the warp inserts 54 are held in position through the engagement of the transversely extending stitch sections 60 which are spaced longitudinally therealong. The longitudinally extending stitch sections 58 contact the outer face of the transversely extending weft inserts so as to hold them into position.

The construction of the warp inserts is identical with the construction of the warp inserts 14 previously described with respect to the unidirectional fabric 10. Moreover, the construction of the weft inserts is likewise identical. The total width of the weft inserts per unit length of the fabric is 62.5%. The total weight of the reinforcing material in the fabric per square yard is 25 oz. per square yard.

It will be understood that the fabric 50, like the fabric 10 and fabric 30, is arranged to be embodied in a laminate. Although not shown, it will be understood that a cross-section of the laminate taken along a plane between two weft inserts would be similar to the cross-section shown in FIG. 2.

It will be understood that the above-described fabrics constitute specific examples of fabrics constructed in accordance with the principles of the present invention. The various characteristics of the fabrics may be varied without departing from the principles of the present invention. For example, the weft knit yarn fabric may be formed of yarn of any suitable material, the polyester specific example merely being illustrative. Any appropriate textile fiber may be utilized. In general it can be stated that the yarns which make up the weft knit fabric need have just sufficient strength to maintain the inserts in parallelism. Substantially 100% of the strength imparted to the laminate is provided by the insert reinforcing material and the yarns of the weft knit fabric do not enter into this strength consideration. Indeed, the yarns may be of a material which would fuse with the thermosetting resin during cure if desired. It will also be understood that the stitch utilized in the weft knit fabric is not limited to the jersey stitch but that a knit and tuck stitch or a knit and tuck and welt stitch may be utilized, if desired. It will also be understood that the configuration of the knit fabric can be readily modified by removing the predetermined spaced needles from the knitting machine. The particular manner in which the warp inserts are held within the unidirectional fabric and the particular manner in which the warp and weft inserts are held within the bi-directional fabric can likewise be varied. Variations in this regard will be apparent from the disclosure contained within the aforesaid Marks et al. and Wily patents.

With respect to the inserts, the material from which the continuous monofilaments are made may be either glass, both S and E type, carbon or graphite or aramid. Specific examples of a glass material have already been given. A specific carbon monofilament is exemplified by monofilaments of 0.00032" made of Thornel manufactured by Union Carbide Corporation. A specific example of aramid monofilaments that may be utilzied is aramid monofilaments of 0.00047" diameter made of Kevlar manufactured by E. I. duPont De Nemours & Co. It will be understood that the diameter of the filaments within a given insert grouping may vary as well as the material. The filament diameter should be between 0.00032" and 0.00095". With respect to the size of the inserts, it is preferable that they be the same size throughout the fabric, although the size may be varied, particularly the size of the warp inserts with respect to the weft inserts in the bi-directional fabric. The thickness of the insert may range between 0.003" to 0.38" with a preferred range being 0.01" to 0.25". The width dimension may vary between 0.009" and 0.075" with a preferred range being between 0.03" to 0.6". The ratio of the width to the thickness may vary from 2 to 30, a preferred range being 4.8 to 11.7. The total width of the warp insert per unit width of fabric may vary from 55 to 98%, preferably higher than 60%. The total width of the weft inserts per unit length of fabric is likewise within the range of 55 to 98%, preferably greater than 60%.

In general it can be stated that as the thickness of the inserts increases the widths also increase and the ratio of the width to the thickness also increases, as well as the total width percentages.

The fabrics of the present invention are useful in making any of the laminate articles previously mentioned. In making these laminates, there can be used to impregnate the present fabrics the resins which are conventionally employed for impregnating glass, e.g. in making laminated plastics. Thus there can be used any of the materials disclosed in Duffin, Laminated Plastics, Second Edition (1966). For example, there can be employed polyesters of the type disclosed therein, e.g. styrene modified ethylene glycolpropylene glycol maleate-phthalate or epoxy resins, e.g. bis phenol A-eipchlorhydrin, phenolic resins, e.g. phenolformaldehyde or cresol formaldehyde, aminoplasts, e.g. urea-formaldehyde or melamine formaldehyde, polyurethanes (of either the thermoplastic or thermosetting type) e.g. dipropylene glycol-toluene di-isocyanate or propylene glycol-trimethyol propane-adipate, silicones or thermoplastic resins such as Teflon, e.g. polytetrafluoroethylene, an acrylic resin such as methyl methacrylate resin, olefin polymers, e.g. polyethylene, polypropylene or ethylenepropylene copolymers.

It thus will be seen that the objects of this invention have been fully and effectively accomplished. It will be realized, however, that the foregoing preferred specific embodiment has been shown and described for the purpose of illustrating the functional and structure principles of this invention and is subject to change without departure from such principles. Therefore, this invention includes all modifications encompassed within the spirit and scope of the following claims.

What is claimed is:

1. A reinforcing fabric for a resinous laminate comprising
    a weft knit yarn fabric formed of a multiplicity of weft knit stitches and
    a multiplicity of parallel longitudinally extending warp inserts held in said weft knit fabric by longitudinally extending stitch sections of yarn between said inserts and transversely extending stitch sections of yarn on opposite sides of said inserts spaced longitudinally therealong,
    each of said inserts including a multiplicity of continuous monofilaments extending longitudinally in parallel relation with respect to one another without crimp or twist and grouped closely together so that the outline cross-sectional configuration of the group is approximately in the shape of an elongated rectangle, the elongated dimension of which extends transversely in the plane of the reinforcing fabric and constitutes the width of the insert, the other dimension of which constitutes the thickness of the insert and corresponds to the thickness of the reinforcing fabric,
    each monofilament of each insert being formed from a material taken from the group consisting of glass, carbon and aramid and having a cross-sectional diameter of between 0.00032" and 0.00095",
    each insert having the thickness of the rectangular cross-sectional configuration thereof between 0.003" and 0.38", the width of the rectangular cross-sectional configuration thereof between 0.009" and 0.75" and a ratio of width-to-thickness of between 2 and 30,
    the total width of the inserts per yard width of fabric being between 55% and 98%.

2. A reinforcing fabric as described in claim 1 wherein said filaments are made of E-glass.

3. A reinforcing fabric as described in claim 1 wherein said thickness is between 0.01" and 0.25", said width is between 0.03" and 0.6" and said ratio is between 4.8 and 11.7.

4. A laminate comprising a body of cured thermosetting resinous material having a fabric embedded therein, said fabric comprising
    a weft knit yarn fabric formed of a multiplicity of weft knit stitches and
    a multiplicity of parallel longitudinally extending warp inserts held in said weft knit fabric by longitudinally extending stitch sections of yarn between said inserts and transversely extending stitch sections of yarn on opposite sides of said inserts spaced longitudinally therealong,
    each of said inserts including a multiplicity of continuous monofilaments extending lontitudinally in parallel relation with respect to one another without crimp or twist and grouped closely together so that the outline cross-sectional configuration of the group is approximately in the shape of an elongated rectangle, the elongated dimension of which extends transversely in the plane of the reinforcing fabric and constitutes the width of the insert, the other dimension of which constitutes the thickness of the insert and corresponds to the thickness of the reinforcing fabric,
    each monofilament of each insert being formed from a material taken from the group consisting of glass, carbon and aramid and having a cross-sectional diameter of between 0.00032" and 0.00095",
    each insert having the thickness of the rectangular cross-sectional configuration thereof between 0.003" and 0.38", the width of the rectangular cross-sectional configuration thereof between 0.009" and 0.75" and a ratio of width-to-thickness of between 2 and 30,
    the total width of the inserts per yard width of fabric being between 55% and 98%.

5. A laminate as described in claim 4 wherein said filaments are made of E-glass.

6. A laminate as described in claim 4 wherein said thickness is between 0.01" and 0.25", said width is between 0.03" and 0.6" and said ratio is between 4.8 and 11.7.

7. A reinforcing fabric for a resinous laminate comprising
    a weft knit yarn fabric formed of a multiplicity of weft knit stitches, a multiplicity of parallel longitudinally extending warp inserts and a multiplicity of parallel transversely extending weft inserts held in said weft knit fabric by longitudinally extending stitch sections of yarn on an outer side of said transversely extending weft inserts spaced therealong and transversely extending stitch sections of yarn on an outer side of said warp inserts spaced longitudinally therealong, each of said inserts including a multiplicity of continuous monofilaments extending longitudinally in parallel relation with respect to one another without crimp or twist and grouped closely together so that the outline cross-sectional configuration of the group is approximately in the shape of an elongated rectangle, the elongated dimension of which extends transversely in the plane of the reinforcing fabric and constitutes the width of the insert, the other dimension of which constitutes the thickness of the insert and corresponds to the thickness of the reinforcing fabric, each monofilament of each insert being formed from a material taken from the group consisting of glass, carbon and aramid and having a cross-sectional diameter of between 0.00032" and 0.00095", each insert having the thickness of the rectangular cross-sectional configuration thereof between 0.003" and 0.38", the width of the rectangular cross-sectional configuration thereof between 0.009" and 0.75" and a ratio of width-to-thickness of between 2 and 30, the total width of the warp inserts per yard width of fabric being between 55% and 98%, the total width of the weft inserts per yard length of fabric being between 55% and 98%.

8. A reinforcing fabric as described in claim 7 wherein said filaments are made of E-glass.

9. A reinforcing fabric as described in claim 7 wherein said thickness is between 0.01" and 0.25", said width is between 0.03" and 0.6" and said ratio is between 4.8 and 11.7.

10. A laminate comprising a body of cured thermosetting resinous material having a fabric embedded therein, said fabric comprising a weft knit yarn fabric formed of a multiplicity of weft knit stitches, a multiplicity of parallel longitudinally extending warp inserts and a multiplicity of parallel transversely extending weft inserts held in said weft knit fabric by longitudinally extending stitch sections of yarn on an outer side of said transversely extending weft inserts spaced therealong and transversely extending stitch sections of yarn on an outer side of said warp inserts spaced longitudinally therealong, each of said inserts including a multiplicity of continuous monofilaments extending longitudinally in parallel relation with respect to one another without crimp or twist and grouped closely together so that the outline cross-sectional configuration of the group is approximately in the shape of an elongated rectangle, the elongated dimension of which extends transversely in the plane of the reinforcing fabric and constitutes the width of the thickness of the insert and corresponds to the thickness of the reinforcing fabric, each monofilament of each insert being formed from a material taken from the group consisting of glass, carbon and aramid and having a cross-sectional diameter of between 0.00032" and 0.00095", each insert having the thickness of the rectangular cross-sectional configuration thereof between 0.003" and 0.38", the width of the rectangular cross-sectional configuration thereof between 0.009" and 0.75" and a ratio of width-to-thickness of between 2 and 30, the total width of the warp inserts per yard width of fabric being between 55% and 98%, the total width of the weft inserts per yard length of fabric being between 55% and 98%.

11. A laminate as described in claim 10 wherein said filaments are made of E-glass.

12. A laminate as described in claim 10 wherein said thickness is between 0.01" and 0.25", said width is between 0.03" and 0.6" and said ratio is between 4.8 and 11.7.

* * * * *